United States Patent [19]

Kocher

[11] 4,391,837

[45] Jul. 5, 1983

[54] PROCESS FOR THE MANUFACTURE OF A LIQUID, PASTE OR POWDER WHEY PRODUCT SIMULATIVE OF A SKIN MILK PRODUCT

[75] Inventor: Johann Kocher, Salzburg County, Austria

[73] Assignee: Alpi Milchindustrie reg. Gen. m.b.H., Salzburg, Austria

[21] Appl. No.: 43,699

[22] Filed: May 30, 1979

[30] Foreign Application Priority Data

May 30, 1978 [AT] Austria .................................. 3909/78

[51] Int. Cl.³ ............................................ A23C 21/00
[52] U.S. Cl. .................................... 426/583; 426/491
[58] Field of Search ................ 426/583, 580, 443, 478, 426/490, 491

[56] References Cited

U.S. PATENT DOCUMENTS 3,930,039  12/1975  Kuipers .............................. 426/271

FOREIGN PATENT DOCUMENTS 1313085  4/1973  United Kingdom ................ 426/478

OTHER PUBLICATIONS

Fenton-May, R. I. et al., 'Use of Ultrafiltration/Reverse Osmosis Systems for the Concentration and Fractionation of Whey', J. of Food Science, 1971, vol. 36, pp. 14–21.

McDonough, F. E. et al., 'Protein Concentrate From Cheese Whey by Ultrafiltration', Journal of Dairy Science, vol. 54, No. 10, Oct. 1971, pp. 1406–1409.

*Primary Examiner*—Raymond N. Jones
*Assistant Examiner*—Elizabeth J. Curtin
*Attorney, Agent, or Firm*—Flynn, Thiel, Boutell & Tanis

[57] ABSTRACT

A process for the manufacture of liquid, pasty or powdery whey products in which the proportions of protein, lactose and ash substantially correspond to those in skimmed milk, and which are suitable as an additive for foodstuffs and feeds, consists of the steps of ultrafiltering whey in a ratio of about 1:20, by volume, drying the resulting concentrate (if necessary), and mixing it with whey, whey concentrate or whey powder in a ratio of about 4:5, relative to the solids.

4 Claims, 1 Drawing Figure

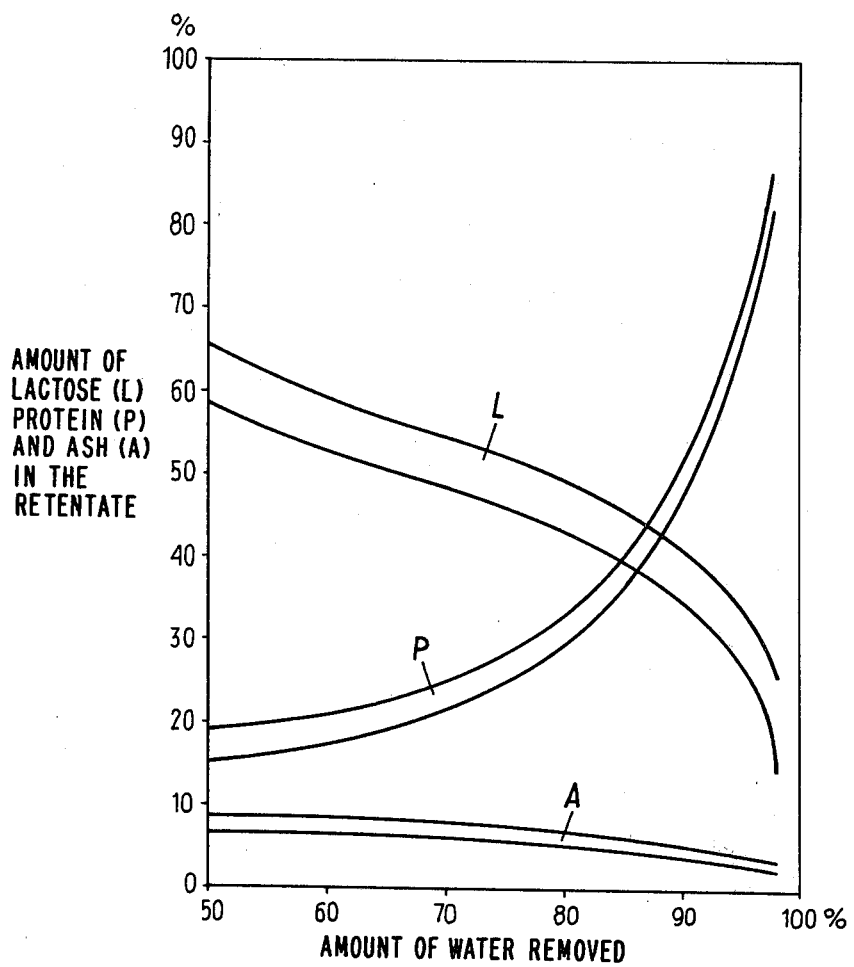

PROCESS FOR THE MANUFACTURE OF A LIQUID, PASTE OR POWDER WHEY PRODUCT SIMULATIVE OF A SKIN MILK PRODUCT

The invention relates to a process for the manufacture of liquid, pasty or powdery whey products in which the proportions of protein, lactose and ash substantially correspond to those in skimmed milk, and which are suitable as an additive for foodstuffs and feeds.

Normal whey powder has the following composition:

| | | |
|---|---|---|
| | Lactose | 71 to 73% |
| | Protein | 11.5 to 12.5% |
| | Fat | 0 to 1.5% |
| | Ash | 9 to 10% |
| | Water | 2 to 4% |

It is due to the high lactose content, the high ash content and the relatively low protein content that whey powder can only be employed in limited amounts both in foodstuffs and in feeds. Skimmed milk powder, which has the following approximate composition:

| | | |
|---|---|---|
| | Lactose | 45 to 51% |
| | Protein | 34 to 39% |
| | Fat | 0.3 to 0.9% |
| | Ash | 6 to 9% |
| | Water | 5% | is considerably more suitable for this purpose.

Accordingly, the present invention seeks to reduce the lactose content and ash content of a whey product, relative to the protein content.

Two processes are known whereby the ash content of whey powder can be reduced, that is to say the whey can be demineralised, namely by electrodialysis and ion exchange. However, demineralisation only results in a small change in the ratio of the ash content to the lactose content and protein content in the whey products.

Whey products having a reduced lactose content and an increased protein content can be manufactured by drying the composition which is obtained as the residual product from the conventional process for the manufacture of milk sugar. These products are so-called partly desugared whey powders which, however, exhibit the disadvantage of a very high proportion of mineral substances and, because of the salty taste caused thereby, cannot be employed in the foodstuffs industry and can only be employed in limited amounts in the feeds industry.

Partly desugared whey powder has the following composition:

| | | |
|---|---|---|
| | Lactose | 36 to 39% |
| | Protein | 23 to 25% |
| | Fat | 1 to 2% |
| | Ash | 24 to 26% |
| | Water | 2 to 4% |

The process, according to the invention, for the manufacture of whey products having an adapted protein, lactose and ash content is based on the knowledge that, when the whey is ultrafiltered, the protein content increases as the concentrating process progresses, whereas the lactose content and the ash content of the concentrate decrease.

The ultrafiltration represents a membrane separation process which is carried out with the use of pressure, the membrane retaining the macromolecular and/or colloidal components of a liquid, according to their size.

The fraction which is retained by the membrane is called the retentate. The fraction which passes through the membrane is called the permeate. The selectivity on ultrafiltration is dependent on the pore size of the membrane used.

BRIEF DESCRIPTION OF THE DRAWING

The drawing is a graph showing the amounts of lactose, protein and ash in the retentate of an ultrafiltration process as a function of the amount of water removed by the ultrafiltration.

On ultrafiltration, the change in the composition of the constitutents of the whey does not occur linearly with the concentrating process but proceeds along curves, the course of which is shown in the attached drawing. The amounts of water removed are plotted in percent on the abscissa. The protein, lactose and ash contents of the solids in the retentate are given, also in percent, on the ordinate. From these curves, it is possible, for every stage of the water removal from 50 to close to 100%, to read off the content of protein (curve P), lactose (curve L) and ash (curve A) of the solids in the individual retentate. By constructing two corresponding curves in each case, the range limits for the natural variations are indicated.

According to the present invention, there is provided a process for the manufacture of liquid, pasty or powdery whey products in which the proportions of protein, lactose and ash substantially correspond to those in skimmed milk, and which are suitable as an additive for foodstuffs and feeds, wherein whey is filtered in a ratio of about 1:20, by volume, by ultrafiltration, the resulting concentrate is dried (if necessary), and mixed with whey, whey concentrate or whey powder in a ratio of about 4:5, relative to the solids.

Thus, the particular advantage of the process according to the invention is that, from a dairy product which can hardly be utilised namely whey, a product is manufactured which is in general demand as an additive for foodstuffs and feeds, namely a product in which the solids correspond to those in skimmed milk. In terms of the intended uses of the new whey product, the nature of the proteins contained therein is unimportant. It is the ratio of the proteins to lactose and to the mineral substances which is essential.

Preferably the concentrate is mixed in a weight ratio of 2:1 with a whey concentrate containing 50% of solids, after which this mixture is concentrated or dried if desired.

Alternatively the concentrate is dried and mixed with dried whey concentrate.

The use of the whey products, manufactured according to the present invention, in the foodstuffs industry serves as a partial or total replacement for skimmed milk powder in processed cheese preparations, bakery products, chocolate, infant feeds, ice-cream or yoghurt. In the manufacture of feeds, the adapted whey products manufactured according to the present invention serve as a partial or optionally total replacement for skimmed milk powder in milk substitutes. Furthermore, this product can be mixed into all other feeds as an ideal protein ingredient.

The following serves to illustrate the relationship between the extent of the water removal and the content of protein, lactose and ash when using ultrafiltration.

Determination of a whey ultrafiltration concentrate with a 1:20, by volume, ultrafiltration In the case of a 1:20, by volume, ultrafiltration selectivity, the water removal, for a whey containing 6.3% of solids, is 96.31% and the permeate contains 5% of solids.

In the case of a 1:20, by volume, ultrafiltration of 10,000 liters of whey containing 6.3% of solids, 9,500 liters of permeate containing about 5% of solids, and 500 liters of retentate, are obtained. The amount of water in the permeate is 9,025 liters, that is to say, based on 9,370 liters of water in the starting whey, 96.31%, of the water was removed from the original whey.

From the curves in the drawing, it is possible, in the case of a 96% water removal (abscissa), to read off the values for the solids contents of protein P, lactose L and ash A in the retentate. The fat content is calculated as follows, starting with a fat content in the whey of 0.05%, with the assumption that the total fat remains in the retentate:

10,000 liters of whey containing 0.05% of fat thus contain 5 kg of fat. After the 1:20, by volume, ultrafiltration, these 5 kg of fat remain in the 500 liters of retentate and this results in a fat content of 1% in the retentate.

Table I gives the percentage contents of lactose, protein and ash, relative to the solids, in the retentate for the 50, 75, 95 and 96% stages of water removal. The values for 0% water removed apply to the average composition of separated whey in the case of a total solids content of 6.3%.

TABLE I

| Water removed % | Content, relative to solids, of | | |
|---|---|---|---|
| | Ash % | Protein % | Lactose % |
| 0 | 0.7 | 0.65 | 4.9 |
| 50 | 6.42 to 8.57 | 15.0 to 18.57 | 58.57 to 65.71 |
| 75 | 5.71 to 7.50 | 25.35 to 28.57 | 46.07 to 52.50 |
| 95 | 2.85 to 4.28 | 65.00 to 70.00 | 27.50 to 34.28 |
| 96 | 2.50 to 3.92 | 70.71 to 75.00 | 24.64 to 31.07 |

Table II shows the ratio of protein to lactose in the solids in the retentate, and also the values of the solids content itself for the 0, 50, 75, 95 and 96% stages of water removal.

TABLE II

| Water removed % | Ratio of protein to lactose in the solids | Solids content % |
|---|---|---|
| 0 | 0.13 | 6.3 |
| 50 | 0.25 to 0.28 | 7.5 to 8.3 |
| 75 | 0.54 to 0.55 | 9.5 to 10.0 |
| 95 | 2.04 to 2.36 | 17.0 to 18.0 |
| 96 | 2.41 to 2.85 | 20.0 |

Determination of a 1:20, by volume, whey ultrafiltration concentrate and of the powder manufactured therefrom Table III, column (a), shows the minimum values for lactose, protein and ash, read off from the drawing, and also the value for the fat in the retentate, relative to the solids.

Column (b) shows the content of lactose, protein, fat and ash in the retentate, the latter containing about 20% of solids.

Column (c) shows the content of lactose, protein, fat and ash in the powder when the retentate is concentrated to a solids content of 96%.

TABLE III

| | (a) | (b) | (c) |
|---|---|---|---|
| Lactose % | 24.64 | 4.93 | 23.49 |
| Protein % | 70.71 | 14.14 | 68.66 |
| Fat % | 1.— | 0.20 | 0.97 |
| Ash % | 2.5 | 0.50 | 2.43 |
| Water % | | | 4.— |

Table IV gives the proportions of lactose, protein, fat, ash and water in a whey containing 6.3% of solids and in a concentrate containing 50% or 96% of solids.

TABLE IV

| | Solids content of | | |
|---|---|---|---|
| | 6.3% | 50% | 96% |
| Lactose | 4.90% | 38.89% | 74.67% |
| Protein | 0.65% | 5.16% | 9.91% |
| Fat | 0.05% | 0.40% | 0.77% |
| Ash | 0.70% | 5.55% | 10.65% |
| Water | 93.70% | 50.00% | 4.00% |
| | 100.00% | 100.00% | 100.00% |

An example of the application of the process according to the present invention is given below.

A powder, which corresponds to skimmed milk powder in its chemical composition, with the exception that the protein is almost exclusively whey protein, that is to say albumin and globulin, is manufactured by mixing two parts of a 1:20, by volume, whey ultrafiltration concentrate with one part of a whey concentrate containing 50% of solids, and by drying this product.

The values are then determined for lactose, protein, fat and ash for a mixture of a 1:20, by volume, whey ultrafiltration concentrate and a whey concentrate containing 50% of solids, in a weight ratio of 2:1, and for the dry product manufactured therefrom.

Table V gives, in column (a), the content of lactose, protein, fat and ash in 100 kg of a 1:20, by volume, ultrafiltration concentrate.

Column (b) gives, in kg, the content of lactose, protein, fat and ash in 50 kg of a whey concentrate containing 50% of solids.

Column (c) gives the sum of the values of the contents of the first two columns.

Column (d) gives the content, in kg, of lactose, protein, fat, ash and water in 100 kg of a mixture of two parts of a 1:20, by volume, ultrafiltration concentrate and one part of a whey concentrate containing 50% of solids.

Column (e) gives the content of lactose, protein, fat, ash and water in the mixture according to column (d), calculated on the basis of a solids content of 96%.

TABLE V

| | (a) | | (b) | | (c) | (d) | (e) |
|---|---|---|---|---|---|---|---|
| Lactose kg | 4.93 | + | 19.45 | = | 24.38 | 16.25 | 52.27 |
| Protein kg | 14.14 | + | 2.58 | = | 16.72 | 11.15 | 35.85 |
| Fat kg | 0.20 | + | 0.20 | = | 0.40 | 0.27 | 0.86 |
| Ash kg | 0.50 | + | 2.78 | = | 3.28 | 2.18 | 7.02 |
| Water kg | 80.23 | + | 25.00 | = | 105.23 | 70.15 | 4.00 |
| Solids kg | 19.77 | | | | | | 96.00 |

Finally, Table VI shows the composition of this dried product in comparison with skimmed milk powder.

TABLE VI

|  | Mixed Product | Skimmed Milk Powder |
|---|---|---|
| Lactose | 52.27% | 45 to 51% |
| Protein | 35.85% | 34 to 39% |
| Fat | 0.86% | 0.3 to 0.9% |
| Ash | 7.02% | 6 to 9% |
| Water | 4.00% | 5% |

The somewhat higher value for lactose in the product obtained by this process, compared with skimmed milk powder, can be further reduced by slightly more selective ultrafiltration.

Depending on the extent of water removal, ultrafiltration concentrates having other protein, lactose and ash concentrations can also be obtained. The whey products or skimmed milk products added to the ultrafiltration concentrates can also have different concentrations. They can be added to the ultrafiltration concentrates individually or together. Subsequent concentration or drying of the mixtures leads to concentrated, pasty or dry products.

I claim:

1. The process for the manufacture of a liquid, paste or powder whey product in which the proportions of protein, lactose and ash substantially correspond to those in skim milk and which whey product is suitable as an additive to foodstuffs and feeds, which comprises the steps of: subjecting whey, as a starting material, to an ultrafiltration membrane separation to separate said whey starting material into a permeate fraction and a retentate fraction in which the volume of said retentate fraction is about 1/20th of the volume of said whey starting material and which retentate fraction contains a higher proportion of protein and lower proportions of lactose and ash than said whey starting material; and then mixing said retentate fraction with a whey concentrate containing at least 50 wt. % of solids or dry whey powder, wherein the mixing ratio of (1) said retentate to (2) said whey concentrate or said dry whey powder, is about 4:5, calculated as the solids, whereby to obtain said whey product.

2. The process according to claim 1 in which said retentate fraction contains from 2.50 to 3.92 wt. % of ash, from 70.71 to 75.00 wt % of protein and from 24.64 to 31.07 wt. % of lactose, calculated as the solids, and wherein the weight ratio of protein to lactose is from 2.41:1 to 2.85:1.

3. The process according to claim 1 or claim 2 in which the retentate is dried prior to mixing it with said whey concentrate or said dry whey powder.

4. The process according to claim 1 or claim 2 in which the mixture of said retentate with said whey concentrate or said dry whey powder is concentrated or dried to obtain said whey product.

* * * * *